United States Patent
Mondragon Sarmiento et al.

(10) Patent No.: US 6,260,912 B1
(45) Date of Patent: Jul. 17, 2001

(54) STRUCTURE FOR A CABIN OF THE CAB-OVER-ENGINE TYPE, FOR MEDIUM TRUCKS AS WELL AS LARGE TRUCKS

(75) Inventors: Francisco Mondragon Sarmiento, Zaragoza Edo, de; Roberto Miranda Guerrero, Juárez, Edo, de; Alejandro Espinosa Ruiz, Hidalgo; Carlos Gonzalez Guadarrama, Zaragoza, Edo, de, all of (MX)

(73) Assignee: Consorcio G. Grupa Dina, S.A. de C.V., Mexico ( * ) Notice: Subject to any disclaimer, the term of this patent is extended or adjusted under 35 U.S.C. 154(b) by 0 days.

(21) Appl. No.: 09/341,049
(22) PCT Filed: Nov. 9, 1998
(86) PCT No.: PCT/MX98/00050
§ 371 Date: Sep. 9, 1999
§ 102(e) Date: Sep. 9, 1999
(87) PCT Pub. No.: WO99/24310
PCT Pub. Date: May 20, 1999

(30) Foreign Application Priority Data

Nov. 7, 1997 (MX) .................................................... 978574

(51) Int. Cl.⁷ .................................................. B62D 33/06
(52) U.S. Cl. .................................. 296/190.08; 180/89.19
(58) Field of Search ........................ 296/190.01, 190.08, 296/190.11, 190.1; 180/89.19

(56) References Cited

U.S. PATENT DOCUMENTS

| | | | |
|---|---|---|---|
| D. 145,414 | * 8/1946 | Allen | D12/96 |
| 3,055,699 | * 9/1962 | May | 296/190.08 |
| 4,978,163 | * 12/1990 | Savio | 296/190.08 |
| 5,769,486 | * 6/1998 | Novoa et al. | 296/210 |
| 5,863,093 | * 1/1999 | Novoa et al. | 296/190.01 |
| 6,012,765 | * 1/2000 | Novoa et al. | 296/190.08 |

FOREIGN PATENT DOCUMENTS

645341 * 11/1950 (GB) .

* cited by examiner

Primary Examiner—Dennis H. Pedder
Assistant Examiner—Patricia Engle
(74) Attorney, Agent, or Firm—Rader, Fishman & Grauer PLLC

(57) ABSTRACT

A modular space frame of cab-over type cabin that can be used without distinction in a medium, heavy, and tractor truck, which may be assembled in the same assembly line of any of these three types of trucks and with the same kind of tools is described. The cabover type cabin is formed by six main sub-assemblies, as follows: (1 and 2) two side sets that correspond to the door ring frame of the left and right doors; (3) a rear section used to support and reinforce the rear panel once the cab-over type cabin is lined on the outside with the skin; (4) a floor section made up by a central rear panel, two side panels and an engine's cover (the set of the floor starts at the base of the rear panel and when it reaches the engine's cover, it tilts downwards until it reaches the cabin's front); (5) a front section, which is formed by a cowl which, jointly with the door ring frames and the header, forms the windshield's frame; and (6) a roof section, which delimits the interior alongside the upper part and provides support to the vehicle's roof. The pieces of the cab-over type cabin may be manufactured with diverse materials, such as high-resistant steel or aluminum, and are joined amongst them by resistance spot welding.

5 Claims, 4 Drawing Sheets

STRUCTURE FOR A CABIN OF THE CAB-OVER-ENGINE TYPE, FOR MEDIUM TRUCKS AS WELL AS LARGE TRUCKS

This application is the national phase of international application PCT/MX/98/00050 filed Nov. 9, 1998 which designated the U.S.

TECHNICAL FIELD RELATED TO THE INVENTION

The present invention is related to the development of an improved space frame for medium, heavy, and tractor truck, and most particularly with the space frame of the cab-over truck cabin; the cabin forms the interior space which the truck operators occupy while driving the vehicle.

BACKGROUND

The space frame of the cab-over type of cabin for medium, heavy, and tractor truck subject matters of the present invention is designated as a modular type, since it is formed by sub-assembled pieces which, in the present case, are the same for medium trucks and tractor trucks. The cab-over type cabin for medium, heavy, and tractor truck subject matters of the present invention may be assembled without distinction in the same assembly line for units class 6, 7 and 8, (the class corresponds to the SAE-Society of Automotive Engineering classification, which includes the vehicles mentioned herein), without the need to stop the assembly line and using the same tool set in both cases.

As a person skilled in the art already knows, medium and heavy trucks are those which, due to their construction, design and utilization are not used to haul a trailer, and the load it transports does not exceed 19 tons. Pursuant to the regulations of Mexico's Ministry of Communications and Transports and according to international standards, a medium truck is an automotive vehicle with a chassis built to transport goods, with a vehicular gross weight that ranges between 6,351 and 14,968 kilograms.

In contrast, a tractor truck is one which, due to its construction, design and use, is adequate to haul all kinds of trailers and is designed to transport large weights through great distances along the highways. Pursuant to the regulations of Mexico's Ministry of Communications and Transports and according to international standards, a tractor truck is an automotive vehicle with two or three axles used to transport goods, be it by means of hauling trailers, semi-trailers or with an integrated equipment, with a vehicular gross weight of 14,969 kilograms or more.

A truck designated as cab-over type is one which, due to its construction, design and utilization, may be used to transport loads and can to haul all kinds of trailers, in the same manner as a conventional tractor truck. The main characteristic of the cab-over trucks is that they do not have a hood, as the engine is located underneath the cabin's floor. To check the engine, the entire cabin is tilted forward.

Until now the space frames of the cab-over type cabin for medium, heavy, and tractor trucks have been constructed separately, in different assembly lines, and using particular tools for each type of vehicle or in the same assembly line. This means that the production of the cab-over type cabin of one kind of vehicle has to be stopped to construct the cab-over type cabin for another kind of vehicle. However, since the various cab-over type cabins have pieces in common, the fact of constructing them in different assembly lines generates down time, as the construction of a cab-over type cabin for one kind of vehicle is suspended for the construction of a cab-over type cabin for another vehicle. Apart from using specific tools for each kind of vehicle and, of course, the personnel to construct and assemble the cab-over type cabin required by each kind of vehicle. In sum, this means greater production expenses, more time used and fewer units produced, thus increasing the cost of cabin units. This is even more serious when there is only one assembly line and it is necessary to stop the manufacturing process of one cab-over type cabin to construct another.

Purposes:
1. To provide the space frame of a cab-over type cabin for medium, heavy, and tractor trucks.
2. To provide the space frame of only one cab-over cabin that may be used for medium, heavy, and tractor trucks.
3. To provide the space frame of one cab-over cabin for medium, heavy, and tractor trucks that can be constructed in the same assembly line of each type of vehicle.
4. To provide the space frame of a single cab-over cabin for medium, heavy, and tractor trucks that can be manufactured with the same type of tools.
5. That the production of one type of a cab-over cabin for one kind of vehicle does not stop in order to manufacture the cab-over type cabin for other kind of vehicle.
6. To reduce expenses in time, money, personnel, and tools in the manufacture of the cab-over type cabins required for medium, heavy, and tractor trucks.

DETAILED DESCRIPTION OF THE INVENTION

Figure 1:
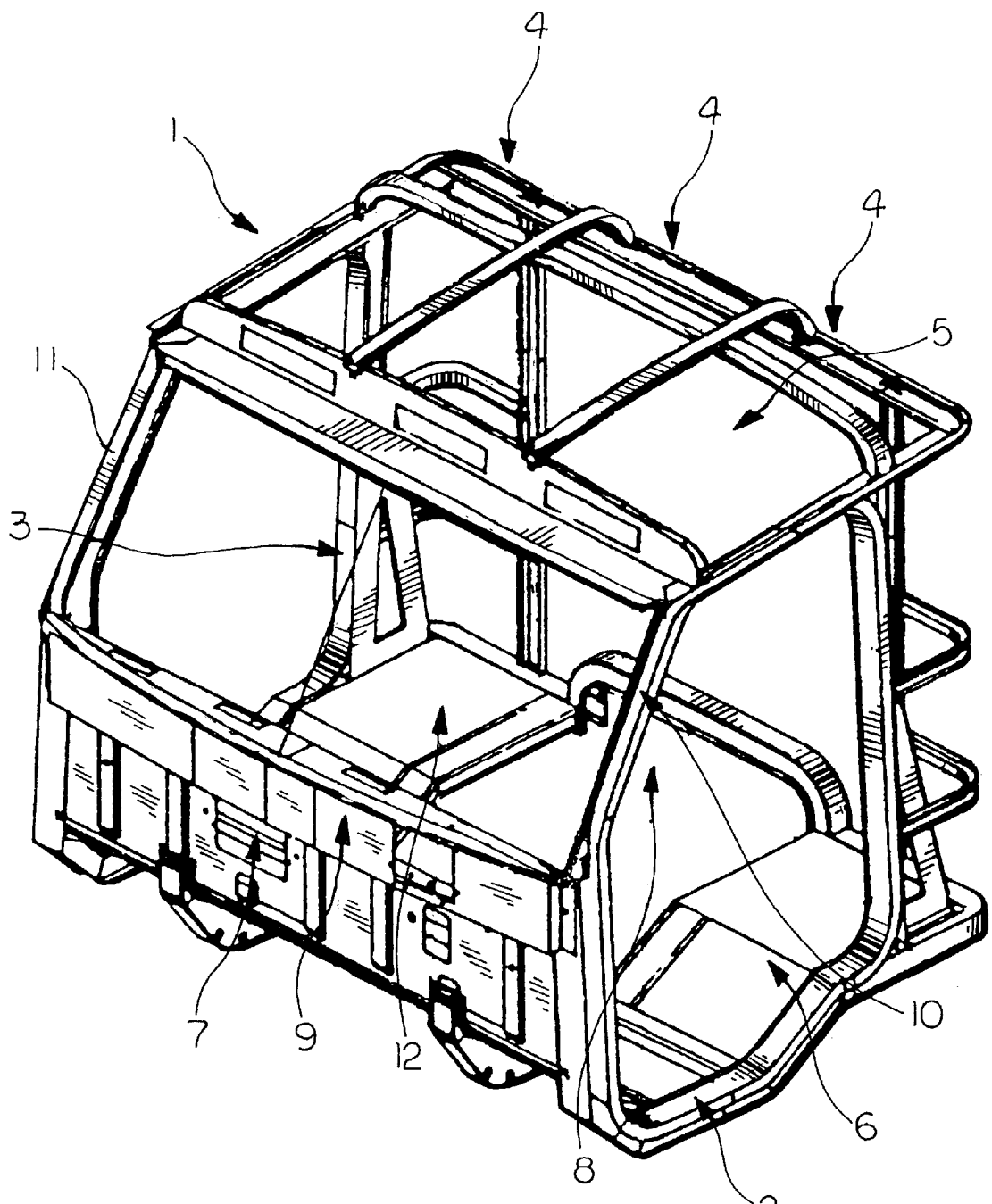
FIG. 1 depicts a 30° perspective of the space frame of the cab-over type cabin for medium, heavy, and tractor truck.

The present invention is related to application Ser. No. 09/3,78,223, titled "Cabin space frame for medium, heavy, and tractor truck".

The space frame of the cab-over type cabin for medium, heavy, and tractor truck subject matter of the present invention is designated as modular, since it is formed with sub-assembled pieces which, in the present case, will be similar for medium, heavy, and tractor trucks.

The cab-over type cab for medium, heavy, and tractor truck subject matter of the present invention can be assembled without distinction in the same assembly line for different types of vehicles, without the need to stop the assembly line, and using the same tool set in both cases.

As a person skilled in the art already knows, a medium and heavy truck is that which, due to its construction, design and utilization, is not used to haul any type of trailer and the load it transports does not exceed 19 tons. Pursuant to the regulations of the Ministry of Communications and Transports and, according to international standards, a medium truck is an automotive vehicle with a chassis built to transport goods, with a vehicular gross weight that ranges between 6,351 and 14,968 kilograms.

In contrast, a tractor truck is that which, due to its construction, design and use is adequate to haul all kinds of trailers and is designed to transport large weights through great distances along the highways. Pursuant to the regulations of Mexico's Ministry of Communications and Transports and according to international standards, a tractor truck is an automotive vehicle with two or three axles used to transport goods, be it by means of hauling trailers, semi-trailers or with an integrated equipment, with a vehicular gross weight of 14,969 kilograms or more.

A truck designated as cab-over is one which due to its construction, design and utilization may be used to transport loads in the same manner than a cab-over (with hood) and can also be used to haul all kinds of trailers, in the same manner as a conventional tractor truck. One of the main characteristics of the cab-over trucks is that they do not have a hood because the engine is located underneath the cabin's floor. To check the engine, the entire cabin is tilted forward.

Until now, the space frame of the cab-over type cabin for medium, heavy, and tractor trucks has been constructed by separate in different assembly lines and using particular tools for each type of vehicle, or in the same assembly line, but this meant to stop the production of the cab-over type cabin for other kinds of vehicle. However, since both cab-over type cabins have pieces in common, the fact of constructing them in different assembly lines results in down time since the construction of a cab-over type cabin for one kind of vehicle is suspended for the construction of the cab-over type cabin for other vehicle, apart from using specific tools for each kind of vehicle and of course the personnel to construct and assemble the cab-over type cabin that each kind of vehicle requires; this means greater production expenses, more time used and less number of units produced, thus increasing the cost of said units. This is even more serious when there is only one assembly line and it is required to stop the manufacturing process of one cab-over type cabin to construct another.

FIG. 1 depicts a 30° perspective of the cab-over type cabin's space frame (1) for medium, heavy, and tractor truck, showing most of the parts that make it up. The side sections are constituted by the left door ring frame (2) and the right door ring frame (3). The door ring frames are closed space frames, continuous, having the appearance of a frame, which delimit and shape the doors; is where the doors engage when kept closed once they have been installed in the vehicle. Each door ring frame is fixed to a door ring frame reinforcement (16), which in turn has a back reinforcement (17), and therefore, there are two door ring frame reinforcements (16), one at the left side and other at the right side and two back reinforcements (17), also one in the left side and the other at the right side. The door ring frames, as well as the doors, are symmetrical and opposed to each other.

The rear section is structured by four quarter panel reinforcements, two located at the left, an upper one (19) and a lower one (18), and other two at the right, an upper one (35) and a lower one (41); also, it includes two reinforcements for the rear panel, located one at the back of the left side (20) and other at the back of the right side (36) and fixed to said quarter panel reinforcements. The quarter panel reinforcements (18), (19), (35) and (41) are curved metallic beams which shape and give support to the rear panels located in the back quarter panel reinforcements of the cab-over type cabin. The rear panels are not depicted in the figures since the figures depict the space frame of the cab-over type cabin and the rear panels form the skin of the cabin placed over the space frame. In technical terms, it is called to "line" the cab-over type cabin, this is to say, to cover the space frame of the cab-over type cabin, both inside and outside, to give the cab-over type cabin the finish of one of the trucks we see everyday in streets and highways. Pillar B covers from the door ring frame's reinforcement (16) up to the rear panel reinforcements (20) and (36). The rear panel is a set of pieces that allow to keep joined the left and right side parts, the roof and the floor, and it is where the rear glass window is located.

The floor section (6) has a shape delimited by the base of the door ring frames (2) and (3), where the floor (6) extends from the base of the rear panel (4) and forwardly bends downwards with the required inclination of 30° to join it to the set that makes up the front floor (7), which bears the shape of the door ring frames. The floor's regular shape (6) delimits the cavity (8) where the engine's cover will be placed later and, since it is not part of the space frame, is not depicted in the figures.

Traditionally, in the specifications of the designs of the cabins for medium and heavy trucks, there are used specific designs and dimensions for these type of trucks and, therefore, notwithstanding that, at first sight they may have the same shape, the dimensions of their components vary and, in consequence, they are produced in different assembly lines.

Figure 4:
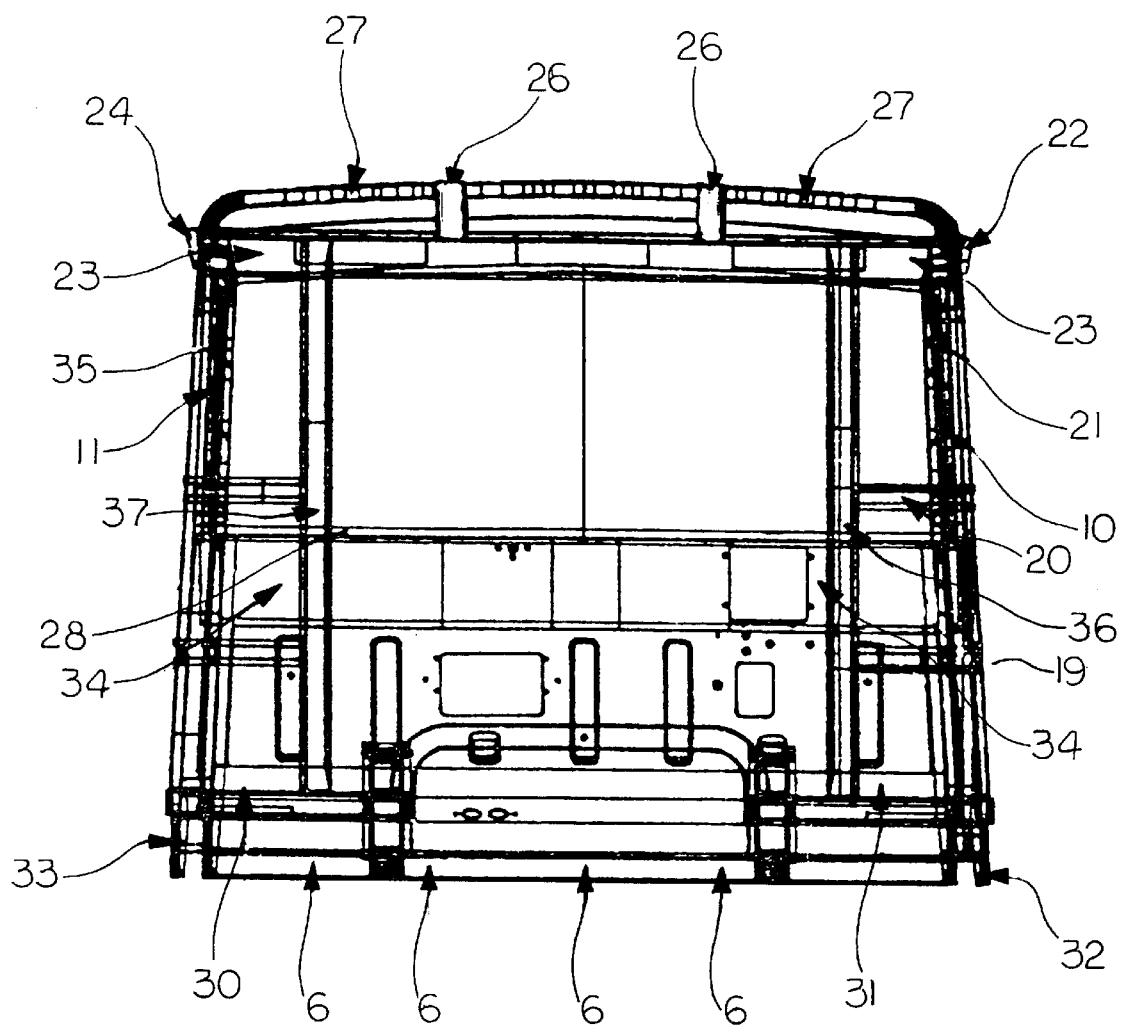
FIG. 4 depicts a front flat view of the space frame of the cab-over type cabin for medium, heavy, and tractor truck.

The left side floor, right side floor and the floor section (6) can be observed better in FIG. 4. In the back side of the floor's regular section (6) there is found a cross member or beam (48), showing two curves downwards near each one of its ends, which are joined, one to the right floor (30) and the other to the left floor (33) and join both floors (30) and (33).

The front section is formed by the front end (7) of the cab-over type cabin, and over it there is located a salient denominated cowl reinforcement (29) joined to two posts, a right one (10) and a left one (9) that support the header (22). The set formed by the cowl reinforcement (29), the posts (9) and (10) and the header or the front upper part of the roof's space frame (22) form the frame of the truck's windshield. Once the cab-over type cabin is lined on the outside, the part of the truck body located in both front corners is called pillar "A", the front side posts (9) and (10) are the framework of pillar "A" that, joined to the front header reinforcement (22) will form the frame of the cabin's windshield.

The roof or top's space frame is formed by one header (22), two side header beams, a right one (24) and a left one (23) and a rear beam (25), this set forms a frame that delimits horizontally and alongside the periphery of the upper part of the interior's contour (11) or the habitable space inside the cab-over type cabin. On this frame there are found at least three beams or cross members, two situated from the rear to the front which divide the roof in three equal parts, one at the right (27) and the other at the left (26), parallel between them and placed on the back beam (25) and the header (22), and one or two beams are placed transversally (28), joining the right side beam (24) of the header with the left side beam (23) of the header.

Figure 2:
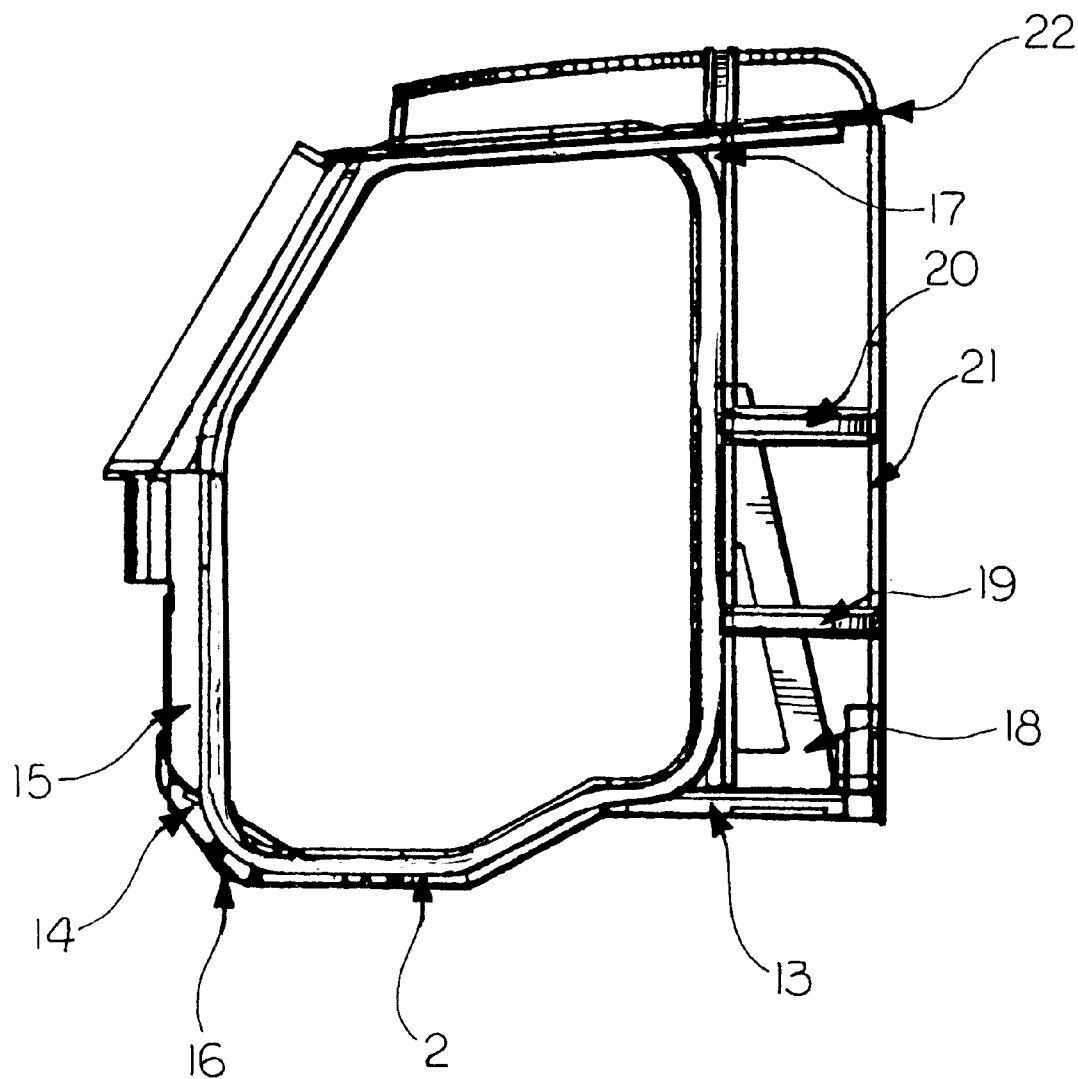
FIG. 2 depicts a left side flat view of the space frame of the cab-over type cabin for medium, heavy, and tractor truck.

In the front section is found the cowl (34) and the cowl reinforcement (29) where 4 openings are located (44, 45, 46 and 47) used for the windshield's defroster; also, the motor of the windshield's wiper is mounted in this piece, amongst other things. FIG. 2 depicts the side left view of the space frame (1) of the cab-over type cabin, which will be lined when the outer roof (5) is integrated therein (skin) and an outer rear panel (skin) (4). The lower part of the space frame of the cab-over type cabin presents a rear transversal platform (39) joined to a lower side platform (12) (both found at the left and at the right, but only one side is described), which bears the shape of the base of the door ring frames (2) and (3), and support the space frame of the cab-over type cabin, the lower side platform (12) is joined to an intermediate side platform (13), one at the left side and other at the right side, which supports the floor (6) from the point where it tilts downwards, and is also used to support the front section of the cab-over type cabin in a vertical position and, supported on the intermediate side platform (13) there is found an upper left side platform (14) and a right one (40). These platforms are joined one to the other with resistance spot welding and reinforced with inner reinforcements; also, the space frame has front bearings (15) used to fix the space frame's front to the chassis.

In FIG. 2 it is observed the set of platforms of the left side, but its counterpart is found on the right side, in such a manner that the space frame they make up is symmetrical; therefore, only one side is depicted.

Figure 3:
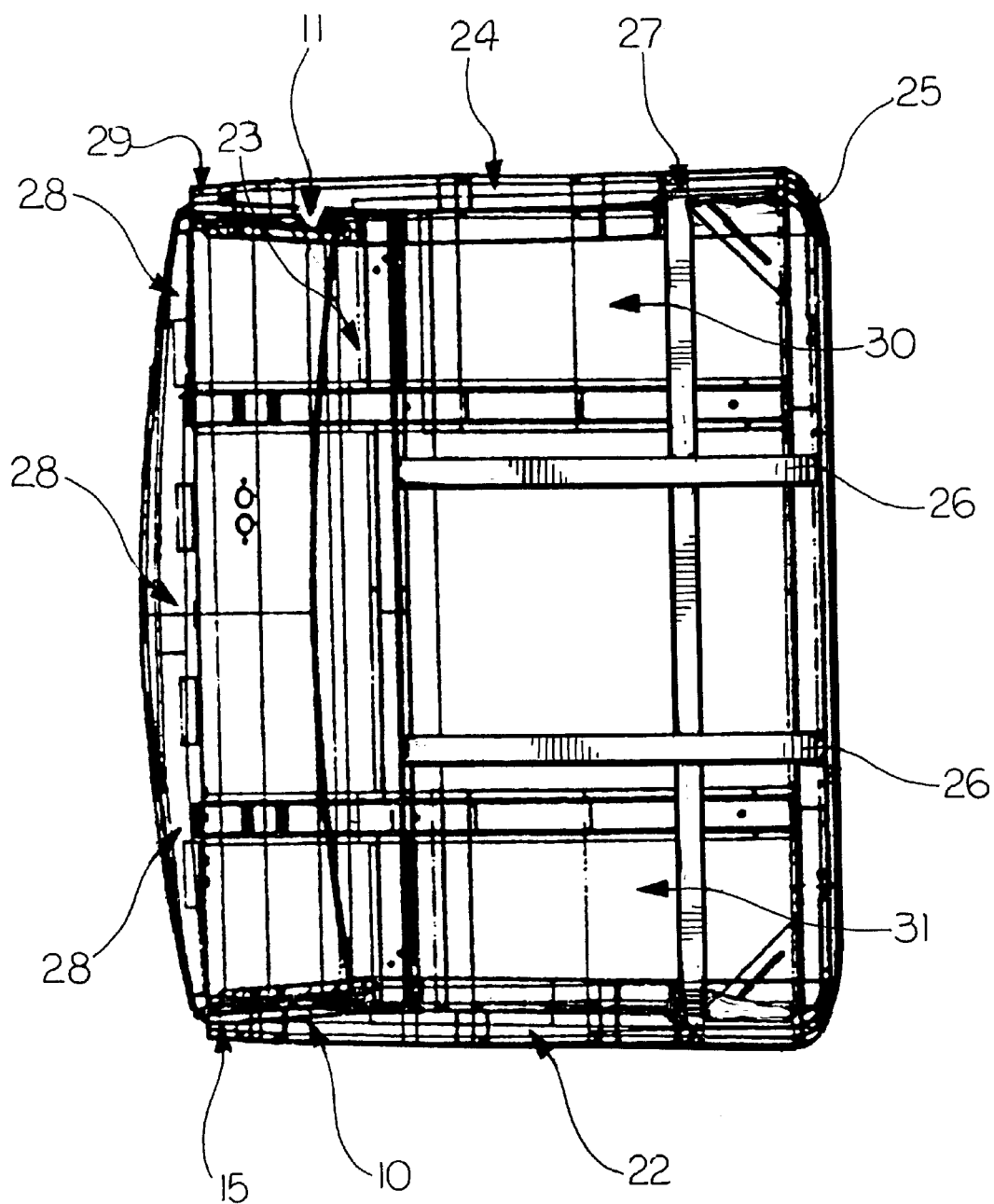
FIG. 3 depicts a top flat view of the space frame of the cab-over type cab for medium, heavy, and tractor truck.

FIG. 3 depicts a view of the space frame of the cab-over type cabin from the top, where the interior can be observed (11) which, apart from being the space intended to be occupied by the driver and his assistant, it is also where there are found the accessories that make the truck useful for transportation; we consider as accessories the seats, steering wheel, dashboard with instruments, gearshift lever, floor mats and everything that is needed in the cab-over type cabin, this is to say, the accessories to which we make reference herein are those attachments required to line the cab-over type cabin on the inside.

The set of the right side floor (30) and the set of the left side floor (33) are joined to the cowl.

The pieces that make up the space frame of the cab-over type cabin may be manufactured from metals such as high-resistant steel or aluminum. The pieces are molded with dies or standard tools; they have grooves to engage them and are fixed with resistance spot welding.

What is claimed is:

1. A space frame for a cabover type truck cabin comprising modular sections, wherein:
    two side sections, left and right, each comprising a door ring frame, a vertical reinforcement attached to a back vertical portion of the door ring frame, and a second reinforcement attached to lower back portion of the vertical reinforcement;
    a floor section comprising a rear transversal platform; a left and a right lower side platform, a left and a right intermediate side platform, a left and a right upper side platform, a floor cross beam, a floor set supported by the platforms, and front bearings attached to the cabin front,
        wherein the rear transversal platform and the lower side platform are joined together, each lower side platforms is further joined to the side-respective intermediate side platform, each intermediate platform being further joined to the side-respective upper side platform;
        wherein the floor cross beam is joined at its left and right ends respectively to the left and right floors,
        wherein the floor set comprises a front floor, a left side floor, and a right side floor, and
        wherein the floor set and the floor cross beam define a central cavity which provides engine access,
    a back section comprising a horizontal quarter panel reinforcements at the lower left, the upper left, the lower right, and the upper right thereof, a vertical left section reinforcement, a right vertical reinforcement, a left plate, and a right plate,
        wherein the horizontal quarter panel reinforcements each attach respectively to the left and right side section vertical reinforcements and to the respective back section vertical reinforcements, left and right, and
        wherein the plates attach to the lower portions of the back section vertical reinforcements and to the rear transversal platform of the floor section;
    an upper section comprising a header, a right header beam, a left header beam, a back beam, a left roof beam, a right roof beam, and at least one transverse beam,
        wherein the ends of the left and right header beams each join the respective ends of both the header beam and the back beam so as to create the horizontal dimensions of a space frame interior,
        wherein the left roof beam and the right roof beam each join both the header beam and the back beam at points central from the ends of the header and back beams, and
        wherein at least one transverse beam joins both the left and right side header beams at points central from the ends of the left and right side header beams;
    a front section comprising a cowl, a cowl reinforcement, a left post, and a right post,
        wherein the cowl and the cowl reinforcement are joined together to create a firewall,
        wherein the front section is joined to the front bearings of the floor section and,
        wherein the left and right posts are joined to the left and right ends, respectively, of the cowl reinforcement, and at their upper ends, to the left and right ends, respectively, of the roof's header.

2. A space frame for a cabover type truck cabin as in claim 1, wherein said floor section extends from the back platform of the rear panel forward to the central cavity, where it tilts downward until it is joined to the cabin's front.

3. A space frame for a cab-over type truck cabin as in claim 1, wherein the pieces comprising each modular section are manufactured from high resistance steel.

4. A space frame for a cabover type truck cabin as in claim 1, wherein the pieces comprising each modular section are manufactured from aluminum.

5. A space frame for a cabover type truck cabin as in claim 1, wherein the pieces comprising each modular section are molded with dies and have grooves with which to engage each other, and are fixed to each other by resistance spot welding.

* * * * *